United States Patent [19]
Wilcher et al.

[11] Patent Number: 5,768,826
[45] Date of Patent: Jun. 23, 1998

[54] AIR WINDOW APPARATUS

[76] Inventors: Lisa Wilcher; Wayne Wilcher, both of Rt. 1 Box 123A, Kite, Ga. 31049

[21] Appl. No.: 775,724

[22] Filed: Dec. 31, 1996

[51] Int. Cl.[6] .................................................. E05B 65/04
[52] U.S. Cl. .................................................. 49/61; 49/31
[58] Field of Search .................................. 49/61, 63, 31, 49/142; 454/221, 224, 278

[56] References Cited

U.S. PATENT DOCUMENTS

| | | | |
|---|---|---|---|
| 3,847,201 | 11/1974 | Kalish | 160/105 |
| 4,331,359 | 5/1982 | Sheldon | 49/63 X |
| 4,443,978 | 4/1984 | Butler | 49/31 |
| 5,165,188 | 11/1992 | Tsiros | 49/63 |
| 5,226,256 | 7/1993 | Fries et al. | 49/31 X |
| 5,570,542 | 11/1996 | Cameron | 49/61 X |
| 5,605,013 | 2/1997 | Hogston | 49/31 |

*Primary Examiner*—Jerry Redman

[57] ABSTRACT

A new Air Window Apparatus for providing an intrusion-proof vehicle ventilation system. The inventive device includes an essentially rigid member having a plurality of ventilation holes extending therethrough.

3 Claims, 3 Drawing Sheets

AIR WINDOW APPARATUS

BACKGROUND OF THE INVENTION

1. Field of the Invention

The present invention relates to vehicle ventilation systems and more particularly pertains to a new Air Window Apparatus for providing an intrusion-proof vehicle ventilation system.

2. Description of the Prior Art

The use of ventilation systems is known in the prior art. More specifically, ventilation systems heretofore devised and utilized are known to consist basically of familiar. expected and obvious structural configurations, notwithstanding the myriad of designs encompassed by the crowded prior art which have been developed for the fulfillment of countless objectives and requirements.

A known prior art ventilation systems include U.S. Pat. No. 3,960,195; U.S. Pat. No. 3,422,876; U.S. Pat. No. 3,434,408; and U.S. Pat. No. 3,729,867.

While these devices fulfill their respective, particular objectives and requirements, the aforementioned patents do not disclose a new Air Window Apparatus. The inventive device includes an essentially rigid member having a plurality of ventilation holes extending therethrough.

In these respects, the Air Window Apparatus according to the present invention substantially departs from the conventional concepts and designs of the prior art, and in so doing provides an apparatus primarily developed for the purpose of providing an intrusion-proof vehicle ventilation system.

SUMMARY OF THE INVENTION

In view of the foregoing disadvantages inherent in the known types of ventilation systems now present in the prior art, the present invention provides a new Air Window Apparatus construction wherein the same can be utilized for providing an intrusion-proof vehicle ventilation system.

The general purpose of the present invention, which will be described subsequently in greater detail, is to provide a new Air Window Apparatus and method which has many of the advantages of the ventilation systems mentioned heretofore and many novel features that result in a new Air Window Apparatus which is not anticipated, rendered obvious, suggested, or even implied by any of the prior art ventilation systems, either alone or in any combination thereof.

To attain this, the present invention generally comprises an essentially rigid member having a plurality of ventilation holes extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Air Window Apparatus and method which has many of the advantages of the ventilation systems mentioned heretofore and many novel features that result in a new Air Window Apparatus which is not anticipated, rendered obvious, suggested, or even implied by any of the prior art ventilation systems, either alone or in any combination thereof.

It is another object of the present invention to provide a new Air Window Apparatus which may be easily and efficiently manufactured and marketed.

It is a further object of the present invention to provide a new Air Window Apparatus which is of a durable and reliable construction.

An even further object of the present invention is to provide a new Air Window Apparatus which is susceptible of a low cost of manufacture with regard to both materials and labor, and which accordingly is then susceptible of low prices of sale to the consuming public, thereby making such Air Window Apparatus economically available to the buying public.

Still yet another object of the present invention is to provide a new Air Window Apparatus which provides in the apparatuses and methods of the prior art some of the advantages thereof. while simultaneously overcoming some of the disadvantages normally associated therewith.

Still another object of the present invention is to provide a new Air Window Apparatus for providing an intrusion-proof vehicle ventilation system.

Yet another object of the present invention is to provide a new Air Window Apparatus which includes an essentially rigid member having a plurality of ventilation holes extending therethrough.

Still yet another object of the present invention is to provide a new Air Window Apparatus that maintains the interior of the vehicle ventilated when the window is closed.

These together with other objects of the invention, along with the various features of novelty which characterize the invention, are pointed out with particularity in the claims annexed to and forming a part of this disclosure. For a better understanding of the invention its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
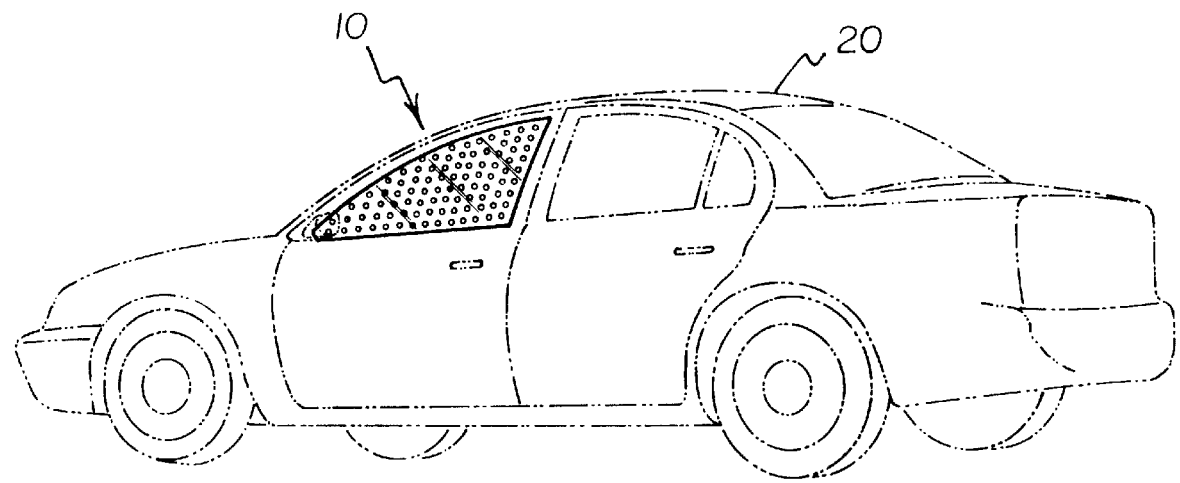
FIG. 1 is a perspective view of a new Air Window Apparatus installed in the window opening of a vehicle according to the present invention.
Figure 2:
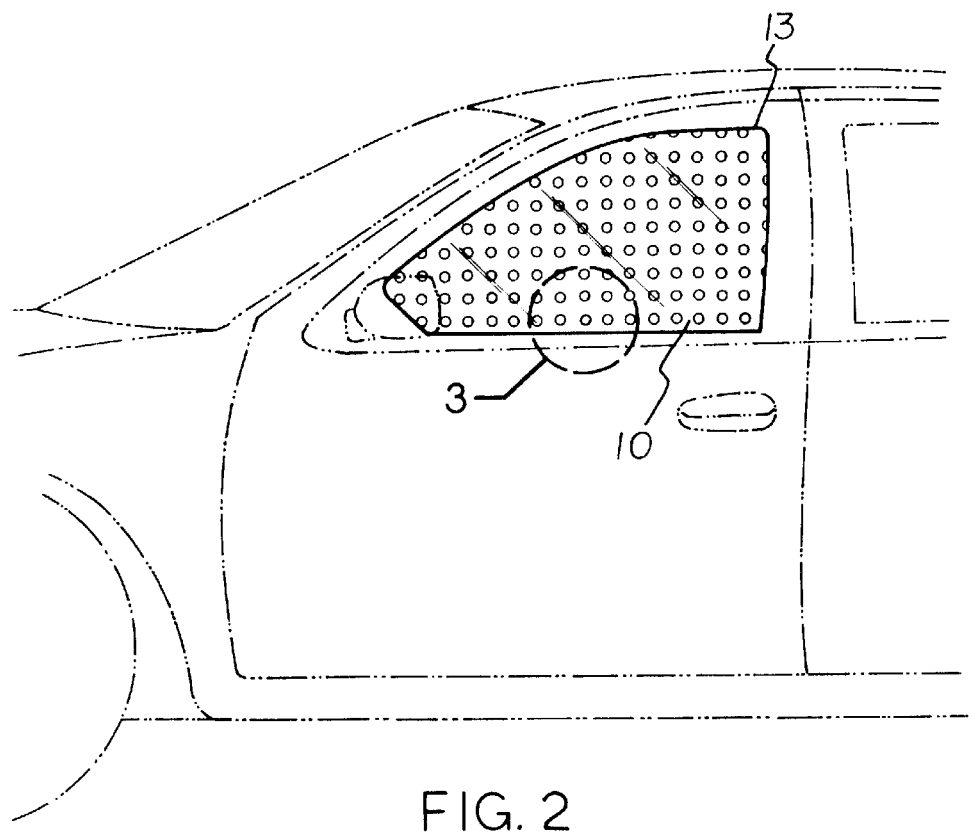
FIG. 2 is a side elevation view thereof.
Figure 3:
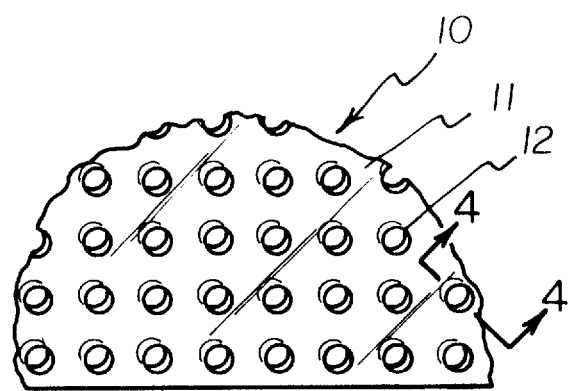
FIG. 3 is a fragmented view thereof.
Figure 4:
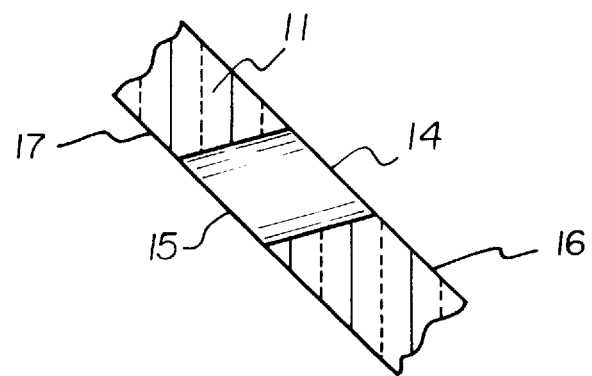
FIG. 4 is a cross sectional view taken along line 4—4 of FIG. 3.

With reference now to the drawings, and in particular to FIGS. 1 through 6 thereof, a new Air Window Apparatus embodying the principles and concepts of the present invention and generally designated by the reference numeral 10 will be described.

More specifically, it will be noted that the Air Window Apparatus 10 comprises an essentially rigid member having a plurality of ventilation holes therethrough for providing intrusion-proof window ventilation.

As best illustrated in FIG. 1 through 4, it can be shown that the Air Window Apparatus 10 is installed in the window opening 13 of a vehicle 20. An essentially rigid member 11 having an interior surface 16 and an exterior surface 17 is made of glass or plastic and has a plurality of ventilation holes 12 therethrough.

The ventilation holes 12 have an interior opening 14 disposed upon the interior surface 16 and an exterior opening 15 disposed upon the exterior surface 17. The interior opening 14 is disposed forwardly and above the exterior opening 15. The ventilation holes 12 are of such dimension that objects or tools cannot be inserted therethrough for the purpose of opening the vehicle's door lock.

Figure 5:
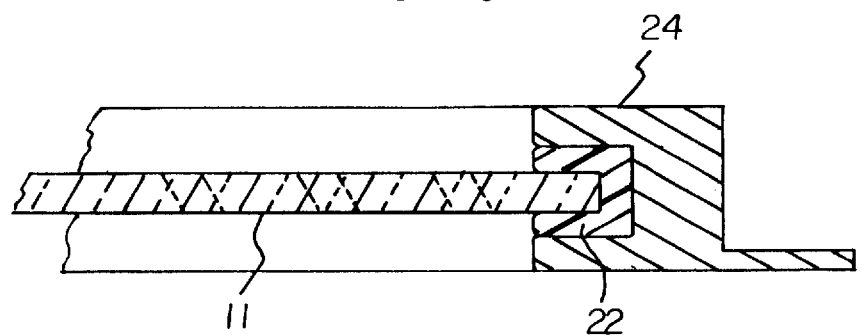
FIG. 5 is a fragmented view showing the Air Window Apparatus installed in a vehicle window channel.

With reference to FIG. 5 the rigid member 11 is shown disposed in a vehicle's window channel 24 including a gasket 22 for forming a seal between the rigid member 11 and the window channel 24. The rigid member 11 is made to move by conventional means well known in the art such as manually (hand crank) or automatically (power windows).

Figure 6:
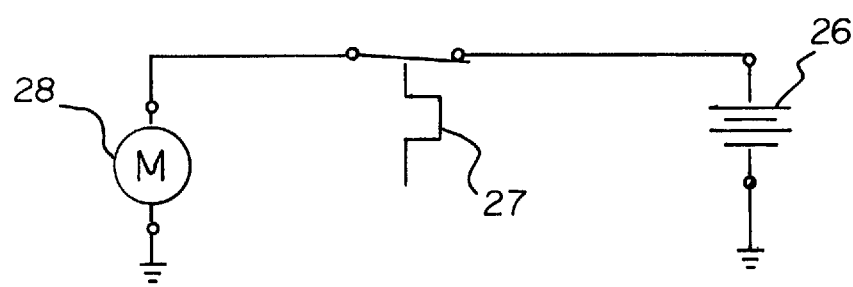
FIG. 6 is a schematic diagram of a circuit for automatically operating the new Air Window Apparatus.

With reference to FIG. 6 a temperature activated switch 27 is shown connected between the vehicle battery 26 and a motor 28, the motor 28 being of the type well known in the art and used to power vehicle windows. The switch 27 is disposed in the interior of the vehicle and is set to close upon the attainment of a pre-set temperature the motor 28 then being actuated to close the rigid member 11 and thereby provide intrusion-proof protection to the interior of the vehicle.

In use, the Air Window Apparatus is closed upon leaving the vehicle thereby providing an intrusion-proof vehicle ventilation system. Alternatively, the Air Window Apparatus closes by means of the temperature activated switch 27, which closes upon the attainment of a pre-set temperature.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An air window apparatus mountable in a window opening of a vehicle comprising:

a transparent essentially rigid member having an outer perimeter shape adapted to fit in the window opening of a vehicle, said rigid member having an interior surface for orienting toward the interior of a vehicle and an exterior surface for orienting toward the exterior of a vehicle, said rigid member having top and bottom edges and a front edge for orienting in the window opening toward the front of the vehicle and a rear edge for orienting in the window opening toward the rear of the vehicle, said rigid member having a plurality of ventilation holes therethrough, each said ventilation hole having an interior opening on the interior surface of the rigid member and an exterior opening on the exterior surface of the rigid member, wherein the interior opening of each said ventilation hole is located relatively closer to the top edge of said rigid member and the exterior opening is located relatively closer to the bottom edge of said rigid member to thereby discourage precipitation entry inward through the ventilation holes, and wherein the interior opening of each said ventilation hole is located relatively closer to the front edge of said rigid member and the exterior opening is located relatively closer to the rear edge of said rigid member to thereby discourage precipitation and wind entry inward through the ventilation holes of said rigid member as the vehicle moves in a forward direction.

2. The air window, apparatus of claim 1 wherein the rigid member is disposed in a vehicle window channel.

3. The air window apparatus of claim 1 further comprising a temperature activated switch electrically connected between a vehicle battery and a vehicle power window motor, and wherein the temperature activated switch closes upon the attainment of a pre-set temperature in the interior of the vehicle to provide power to the vehicle power window motor to move the window downward to expose the ventilation holes of said rigid member.

* * * * *